(No Model.)

W. P. MILLER.
LUBRICATOR.

No. 420,911. Patented Feb. 4, 1890.

Witnesses
John Bicket
Kate E. Pembleton

Inventor,
William P. Miller
by attorneys
Brown & Griswold

UNITED STATES PATENT OFFICE.

WILLIAM P. MILLER, OF BROOKLYN, NEW YORK, ASSIGNOR TO THE WILLIAM P. MILLER COMPANY, OF SAME PLACE.

LUBRICATOR.

SPECIFICATION forming part of Letters Patent No. 420,911, dated February 4, 1890.

Application filed October 22, 1889. Serial No. 327,860. (No model.)

*To all whom it may concern:*

Be it known that I, WILLIAM P. MILLER, of Brooklyn, in the county of Kings and State of New York, have invented a certain new and useful Improvement in Lubricators, of which the following is a specification.

My improvement is applicable to journal-boxes for shafting, but particularly to crank-pins.

I will describe in detail a lubricator embodying my improvement and then point out the novel features in a claim.

Figure 1:
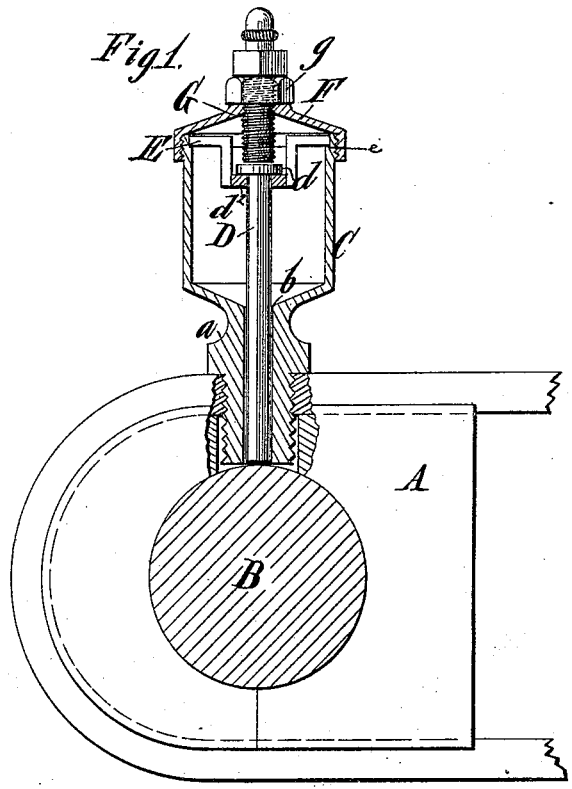
Figure 2:
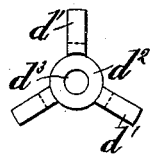

In the accompanying drawings, Figure 1 is a vertical section of a lubricator embodying my improvement, showing the same applied to a crank-pin. Fig. 2 is a plan or top view of a certain spider acting as a stop employed in said lubricator.

Similar letters of reference designate corresponding parts in both figures.

A designates a crank-pin bearing, and B the crank-pin.

C designates a grease-cup, which may be of ordinary construction and is screw-threaded into the crank-pin bearing, so that its lower end extends into close proximity with the crank-pin, as is usual. The shank $a$ of the cup C, which is secured to the crank-pin bearing, is provided with a central aperture $b$. Through this aperture a pin D is adapted to play, which pin by its up-and-down movement assists in conveying the grease from the cup onto the crank-pin. Heretofore such pins have been loose, and the motion of the crank caused a constant pounding of the pin D against the crank-pin, by which the pin D was worn away and the crank-pin injured. I overcome this difficulty by preventing the pin D from coming into contact with the crank-pin. To accomplish this, I provide the upper end of the pin D with a head or flange $d$ and pass the pin through a spider E, (shown more clearly in Fig. 2,) which spider, as shown, has three arms $d'$ and a central cylindrical portion $d^2$, provided with an aperture $d^3$. The pin D extends through the aperture $d^3$, while the flange $d$ of the pin rests upon the central portion $d^2$ in the spider. The pin D is only of such length that when in the position just described it will be maintained by the spider in close proximity to the crank-pin, but out of contact therewith. I prefer to support the spider E by providing the inside of the cup C with a step or flange $e$ near its upper end, and upon which the arms $d'$ of the spider will rest when the spider is in position. The spider E operates as a stop to prevent a too extended movement of the pin D toward the crank-pin.

A cover F, having a screw-threaded connection with the exterior of the cup C, operates to close the upper end of said cup. An adjustable screw G, passing through and engaging a screw-threaded aperture in the cover F, extends downwardly and into close proximity to the pin D. Said screw G operates as a stop to prevent a too extended movement of the pin D in one direction, and the range of movement of the pin may be varied by the adjustment of the screw G. When said screw has been adjusted to the proper position, it may be fixed in such position by a clamping-nut $g$.

It is to be observed that the pin D extends nearly to the upper end of the cup, and also that the stop for limiting the inward movement of the pin D toward the crank-pin is located in the outer end of the cup. This construction is advantageous, because it leaves the lower portion of the cup free and unobstructed, so that the grease may be readily worked down by the pin D.

What I claim as my invention, and desire to secure by Letters Patent, is—

The combination, with a grease-cup adapted to be applied to a crank-pin journal, of a longitudinally-movable pin arranged within said cup and extending to near the top of the cup, and a stop for preventing a too extended movement of said pin toward the crank-pin, which stop is also located near the upper end of the cup, substantially as specified.

WILLIAM P. MILLER.

Witnesses:
FREDK. HAYNES,
D. H. HAYWOOD.